(12) United States Patent
Mihlbauer

(10) Patent No.: US 6,484,669 B1
(45) Date of Patent: Nov. 26, 2002

(54) AQUARIUM BASE

(75) Inventor: Brad L. Mihlbauer, Muskego, WI (US)

(73) Assignee: All-Glass Aquarium Company, Inc., Franklin, WI (US)

( * ) Notice: Subject to any disclaimer, the term of this patent is extended or adjusted under 35 U.S.C. 154(b) by 0 days.

(21) Appl. No.: 09/844,196

(22) Filed: Apr. 27, 2001

(51) Int. Cl.⁷ .............................................. A01K 63/00
(52) U.S. Cl. ..................................................... 119/245
(58) Field of Search ............................... 119/245, 269; D30/101, 106

(56) References Cited

U.S. PATENT DOCUMENTS

| | | | | |
|---|---|---|---|---|
| 3,759,223 A | * | 9/1973 | D'Andrea | 119/259 |
| D246,262 S | * | 11/1977 | Zupo | D30/101 |
| D285,841 S | * | 9/1986 | Tigert | D30/101 |
| D285,845 S | * | 9/1986 | Tigert | D30/101 |
| 4,612,876 A | * | 9/1986 | Tigert | 119/253 |
| D347,911 S | * | 6/1994 | Tominaga | D30/101 |
| D350,626 S | * | 9/1994 | Ross | D30/101 |
| D397,520 S | * | 8/1998 | Ichikawa | D30/101 |
| D397,521 S | * | 8/1998 | Gomi | D30/101 |
| 5,993,021 A | * | 11/1999 | Lin | 362/101 |
| D423,146 S | * | 4/2000 | Wang | D30/101 |
| D429,387 S | * | 8/2000 | Wise | D30/101 |
| D429,503 S | * | 8/2000 | Hsieh | D21/483 |
| D448,124 S | * | 9/2001 | Wang | D30/101 |

* cited by examiner

Primary Examiner—Charles T. Jordan
Assistant Examiner—Judith A. Nelson
(74) Attorney, Agent, or Firm—Andrus, Sceales, Starke & Sewall, LLP

(57) ABSTRACT

An aquarium base is provided by a base member (26, 26a) extending horizontally around a periphery generally coextensive with the periphery of the aquarium tank (22, 22a, 22b), the base member having a lower surface (30, 30a) resting on a horizontal support surface (28), and an upper surface (32, 32a) upon which the aquarium tank rests. The base member has a peripheral skirt (34, 34a) extending generally vertically between the upper and lower surfaces and around the periphery. The peripheral skirt has an upper extension (36, 36a) extending upwardly from the upper surface vertically along and adjacent and outward of the aquarium tank. The peripheral skirt has a first periphery (72, 72a) at the lower surface, and a smaller second periphery (74, 74a) at the upper surface. The peripheral skirt encloses the space (76, 76a) between the horizontal support surface and the bottom of the aquarium tank and has a slot (78, 78a) therethrough, and houses aquarium accessory components in the enclosed space having conduits (82, 94, 102) extending through the slot.

9 Claims, 9 Drawing Sheets

AQUARIUM BASE

BACKGROUND AND SUMMARY

The invention relates to aquariums, and more particularly to an improved base.

The invention arose out of continuing development efforts toward improvements in support structure for aquarium tanks. The present invention provides improved display capability, protection for border frames in the case of glass tanks, enhanced stability, efficient and aesthetically pleasing space utilization, organized and guided multiple conduit routing, and aesthetically pleasing surface profiling.

DETAILED DESCRIPTION

Figure 1:
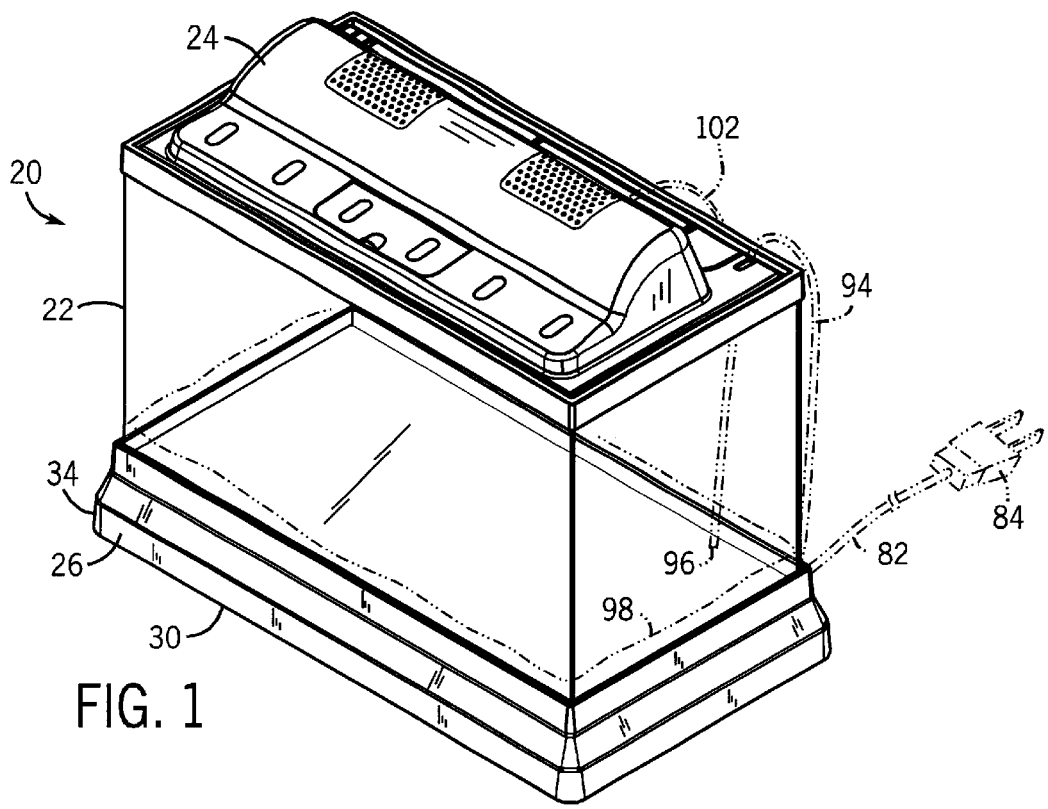
FIG. 1 is an isometric view of an aquarium base in accordance with the invention, and also shows an aquarium tank and cover.
Figure 3:
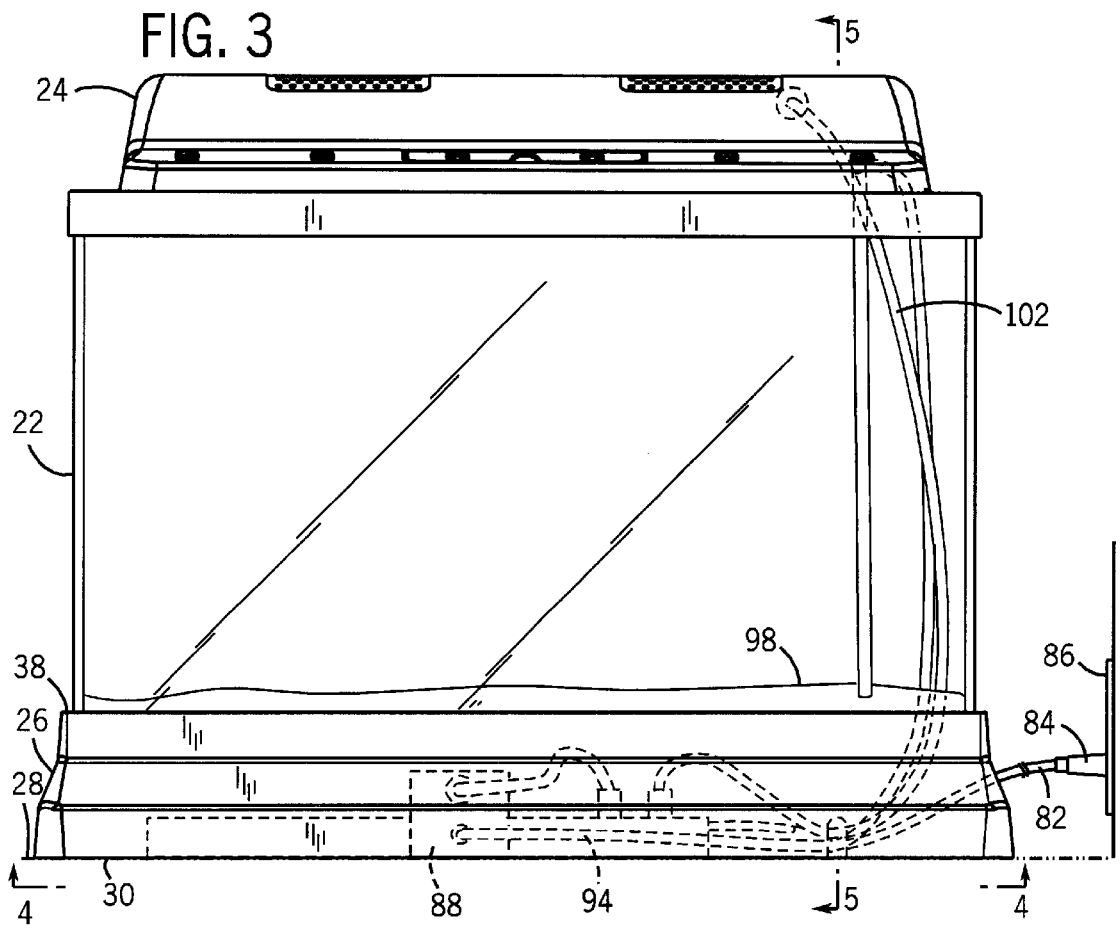
FIG. 3 is a front elevation view of the aquarium assembly of FIG. 1.

FIG. 1 shows an aquarium 20 including an aquarium tank 22, cover 24, and base 26. Base 26 supports tank 22 on a horizontal surface 28, FIG. 3, such as a cabinet or table top. Aquarium base 26 is provided by a base member extending horizontally around a periphery generally coextensive with the periphery of tank 22. Base member 26 has a lower surface 30, FIG. 5, resting on horizontal support surface 28, and an upper surface 32, FIGS. 6, 13, upon which aquarium tank 22 rests. Base member 26 includes a peripheral skirt 34 extending generally vertically between upper and lower surfaces 32 and 30, and extending around the noted periphery. Peripheral skirt 34 has an upper extension 36, FIG. 6, extending upwardly from upper surface 32 vertically along and adjacent and outward of aquarium tank 22, FIG. 5. Upper extension 36 terminates at an upper reach 38 above the bottom 39 of tank 22.

Figure 5:
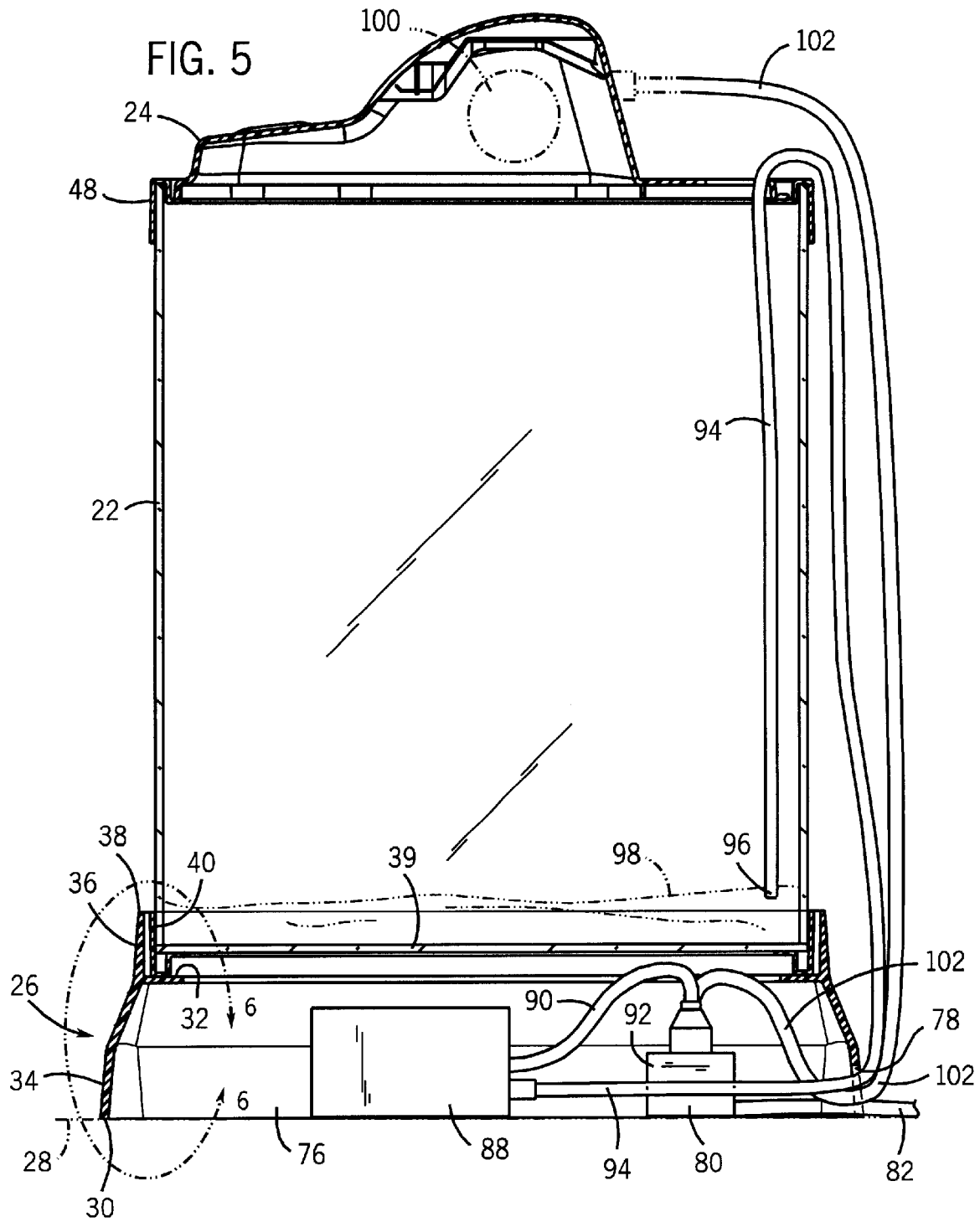
FIG. 5 is a sectional view taken along line 5—5 of FIG. 3.
Figure 6:
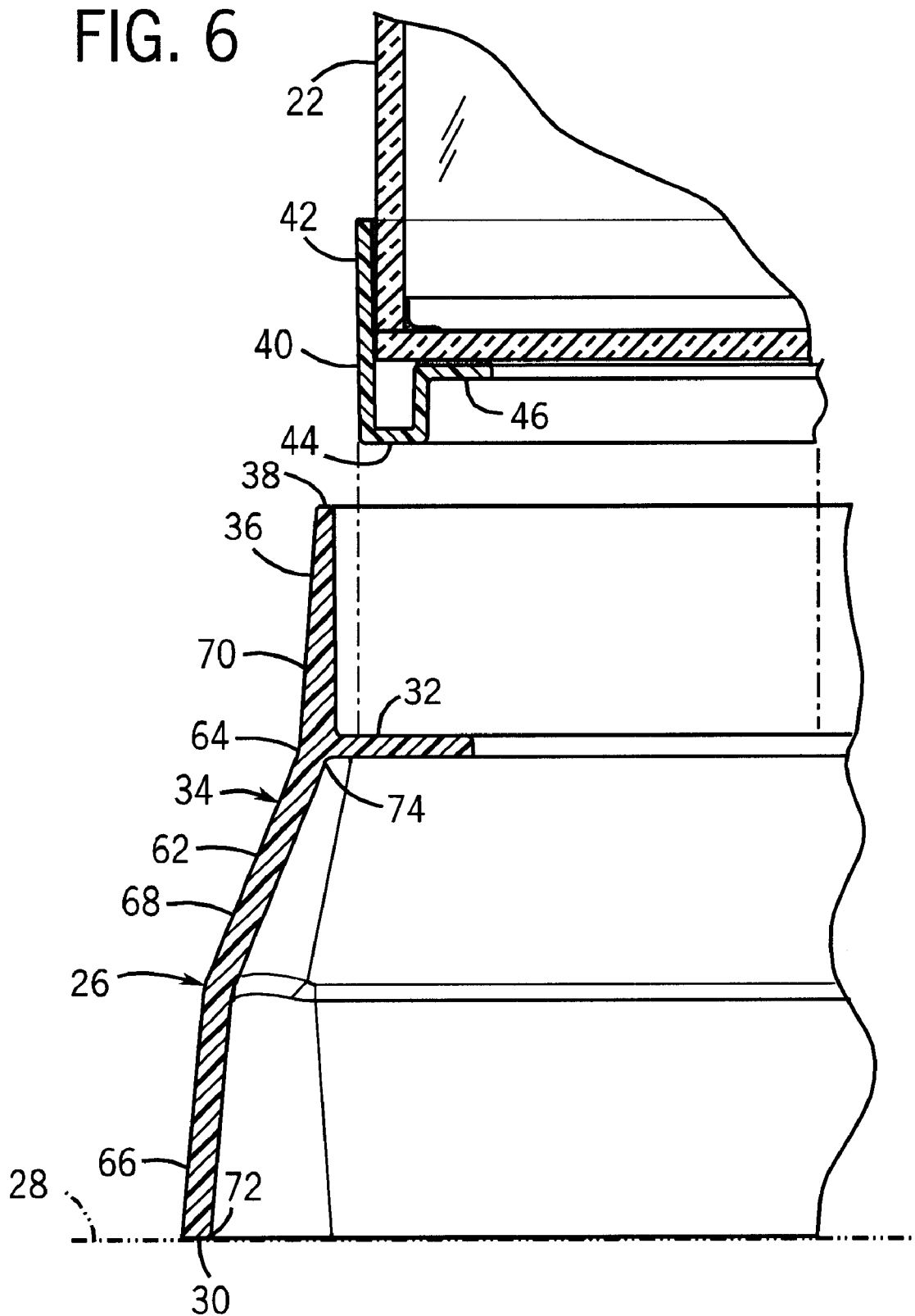
FIG. 6 is an enlarged separational view taken along line 6—6 of FIG. 5.

If aquarium tank 22 is a glass tank, FIGS. 5, 6, it typically has a lower border frame 40 extending partially upwardly along the sides of the tank and partially horizontally along the bottom of the tank, to protect the lower corner edge of the tank. The glass sides and bottom of the tank are adhesively bonded to each other, as is known. Border frame 40 includes vertical portion 42 extending along the side of the tank, lower portion 44 extending downwardly below the bottom of the tank, and horizontal portion 46 extending along the bottom of the tank. Lower portion 44 may be eliminated, and horizontal portion 46 may extend all the way to vertical portion 42. The disclosed border frame 40 is preferred because it is identical to upper border frame 48, FIG. 5, and hence allows stocking of only one universal frame, thus reducing inventory. Such frame itself is known in the prior art. Lower portion 44 of border frame 40 rests on surface 32 of base 26.

Figure 10:
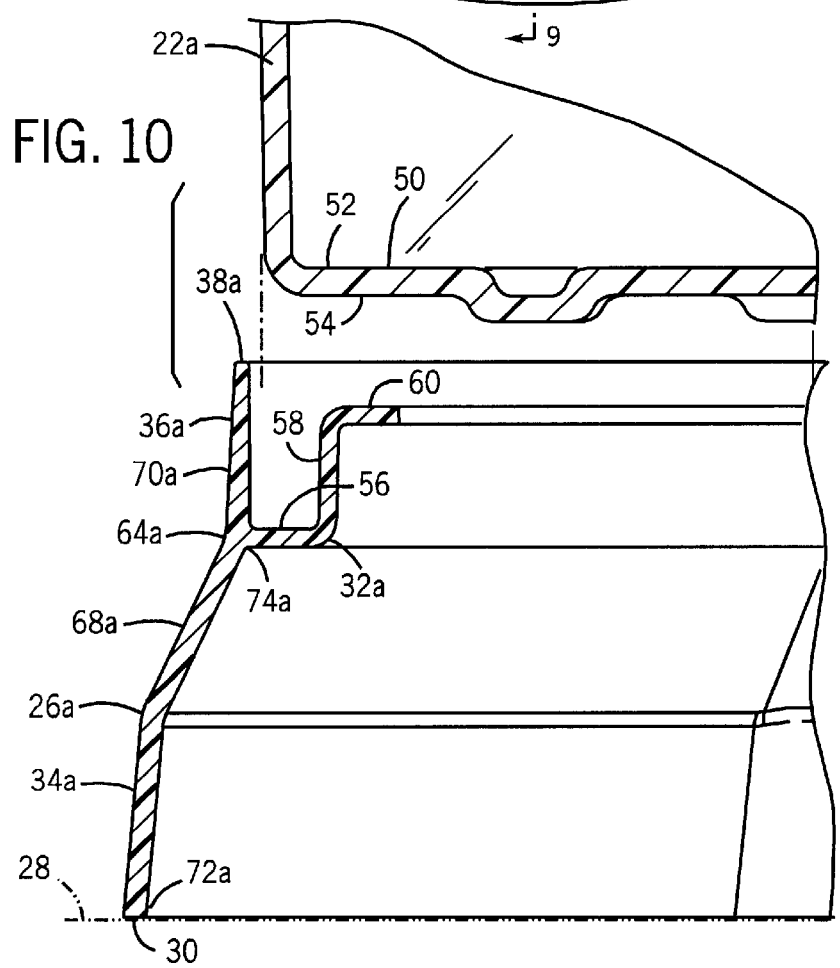
FIG. 10 is an enlarged separational view taken along line 10—10 of FIG. 9.
Figure 9:
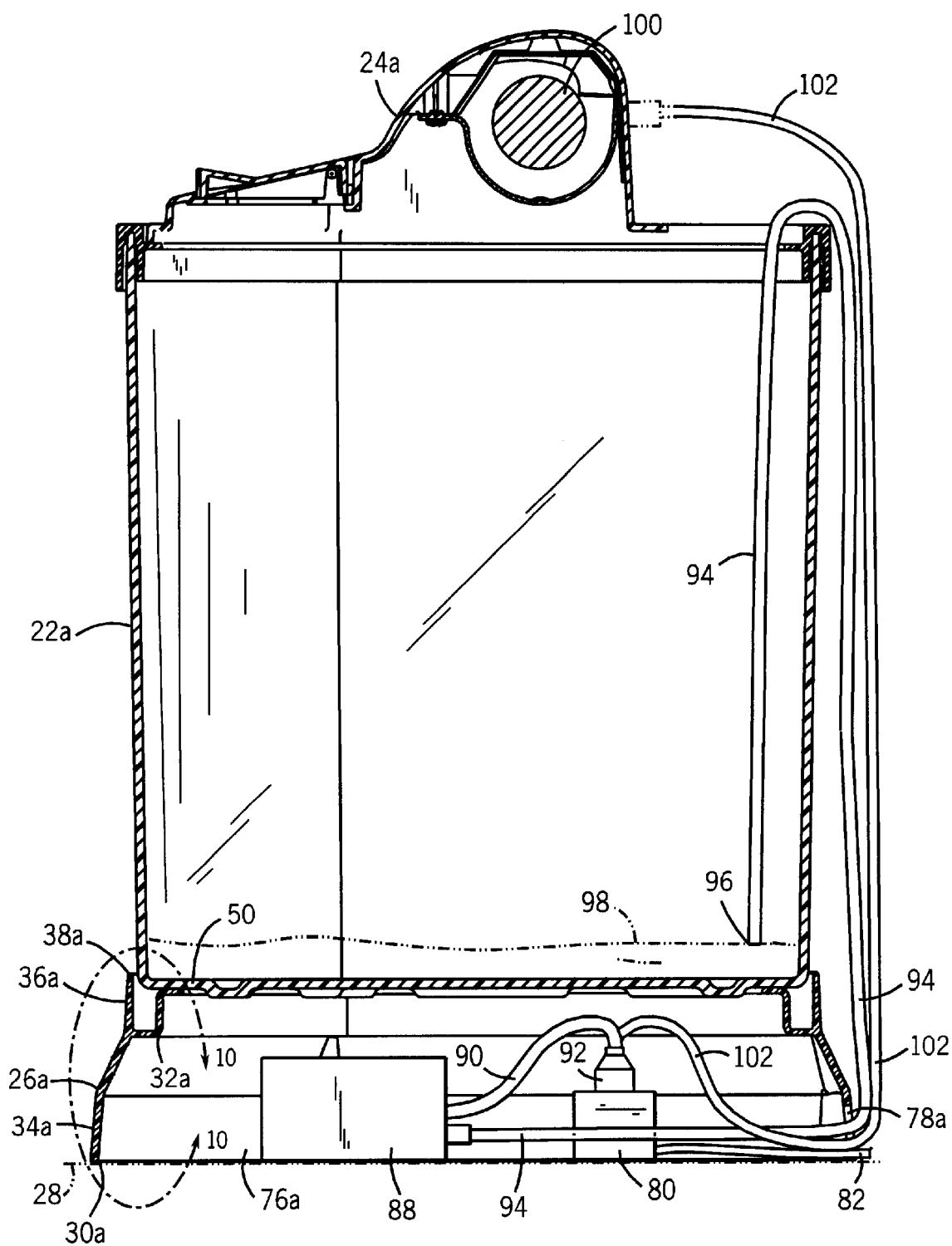
FIG. 9 is a sectional view taken along line 9—9 of FIG. 8.

The aquarium tank may also be a plastic tank, for example as shown at 22a in FIGS. 9 and 10, which drawings and related drawings use like reference numerals from the remaining drawings with the postscript "a" to facilitate understanding. Plastic tanks typically do not have a lower border frame such as 40 of FIG. 6, and hence there is no need to protect nor cover same. Plastic tank 22a has a bottom wall 50 with top and bottom surfaces 52 and 54. Upper surface 32a of base member 26a has a first portion 56 extending horizontally comparably to surface 32 in FIG. 6, and then has a second portion 58 extending upwardly from first portion 56 to elevate the tank, and then has a third portion 60 extending horizontally inwardly from second portion 58. Bottom surface 54 of tank bottom wall 50 rests on surface 60 to thus elevate the tank and afford better viewing. Upper reach 38a of upper extension 36a of peripheral skirt 34a terminates at or above top surface 52 of tank bottom wall 50.

The rectangular tank of FIG. 1 may be either glass, as illustrated, or plastic.

Figure 2:
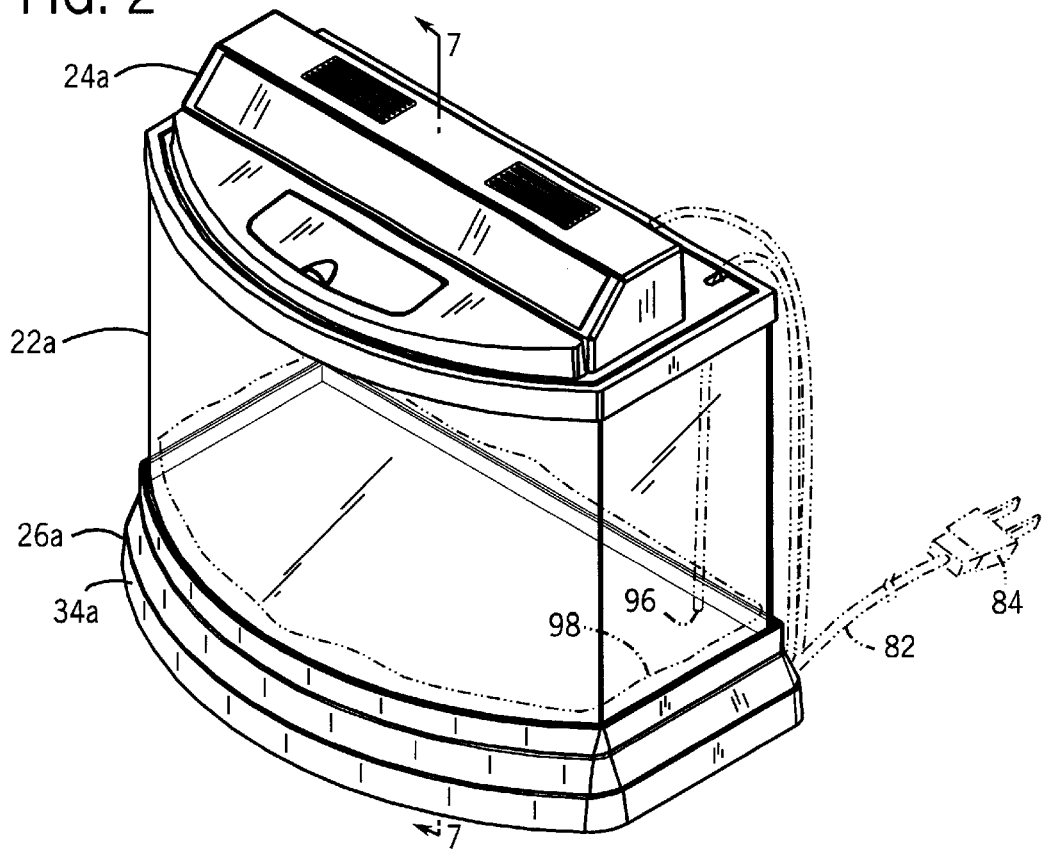
FIG. 2 is like FIG. 1 and shows another embodiment.
Figure 7:
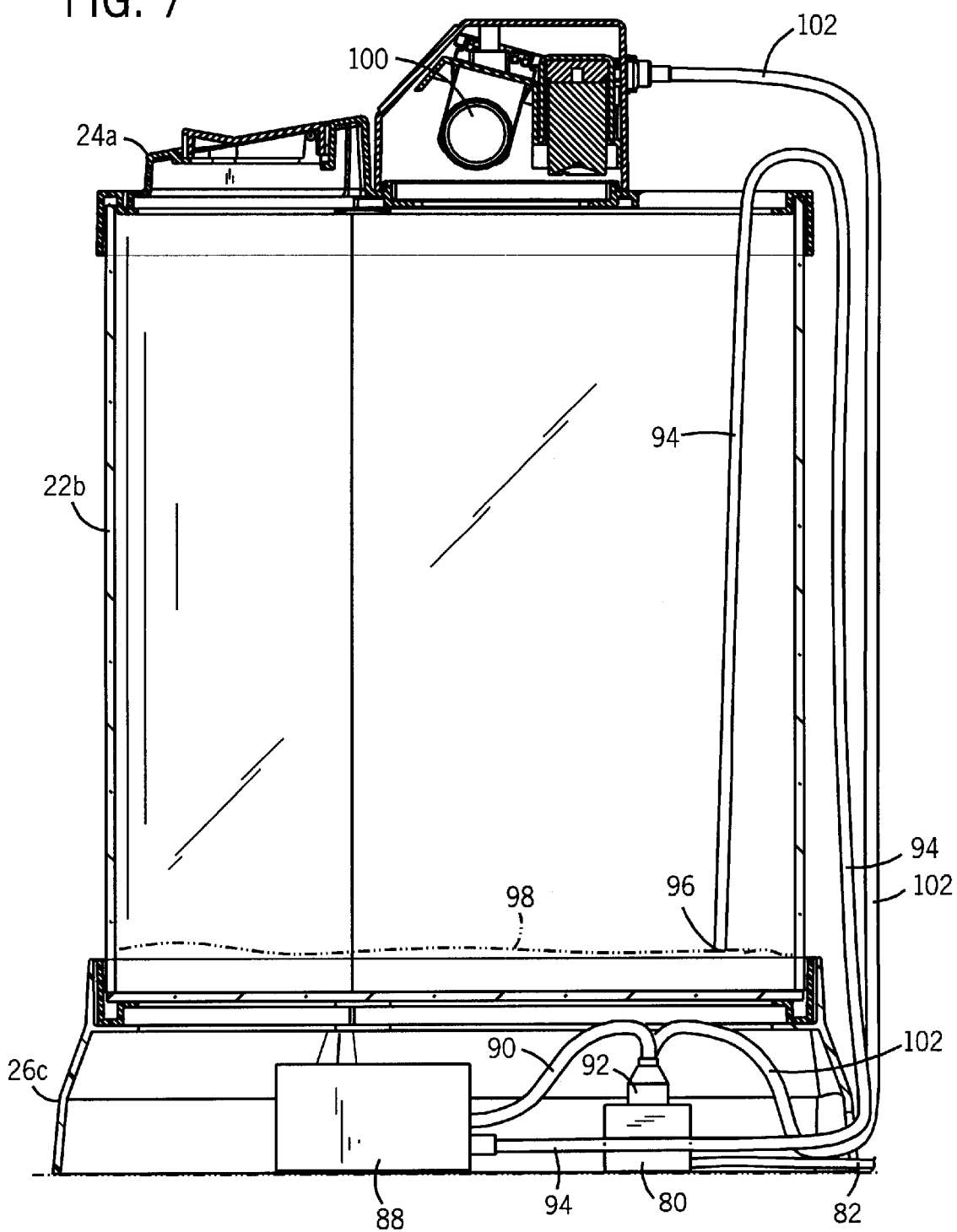
FIG. 7 is a sectional view taken along line 7—7 of FIG. 2.
Figure 8:
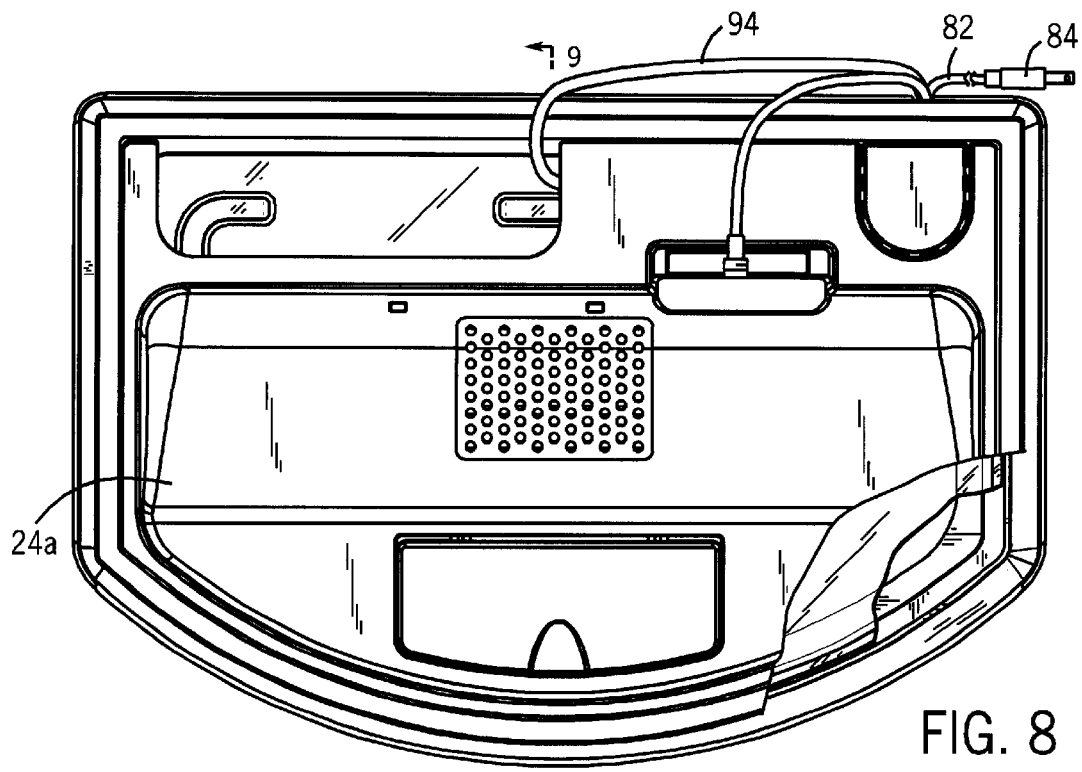
FIG. 8 is a top elevation view of the aquarium assembly of FIG. 2.
Figure 11:
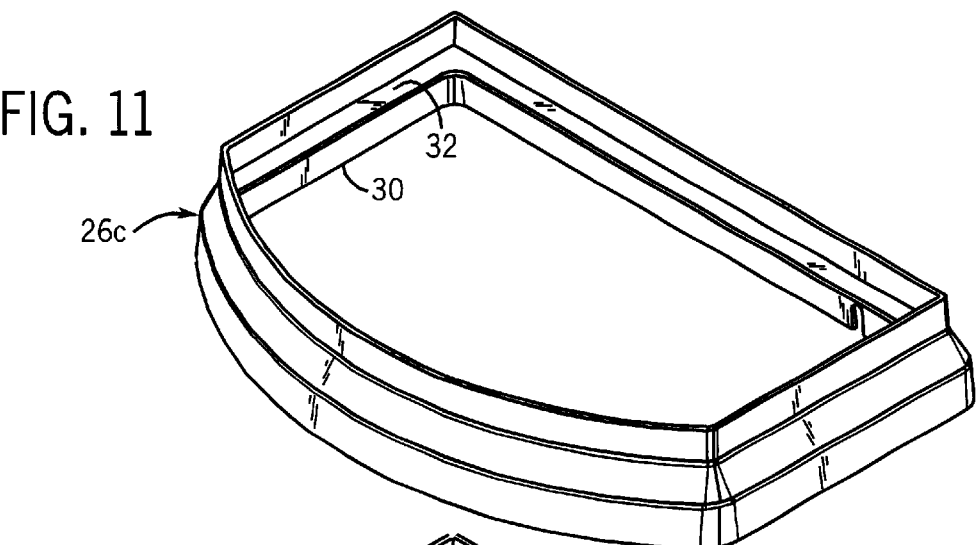
FIG. 11 is an isometric view of one type of aquarium base for the assembly of FIG. 2.
Figure 12:
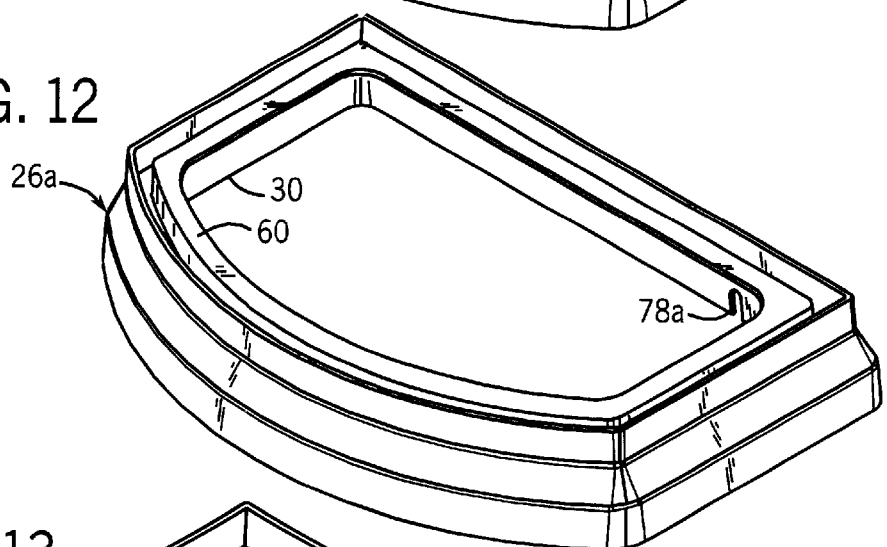
FIG. 12 is like FIG. 11 and shows another embodiment.
Figure 13:
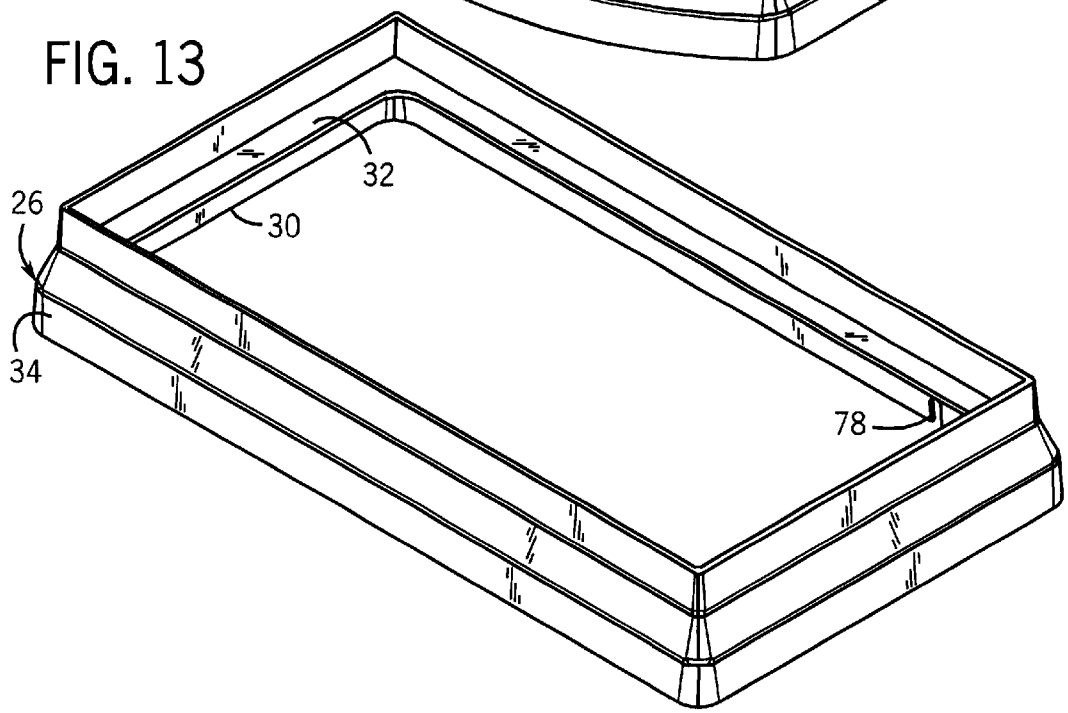
FIG. 13 is an isometric view of one type of aquarium base for the assembly of FIG. 1.
Figure 14:
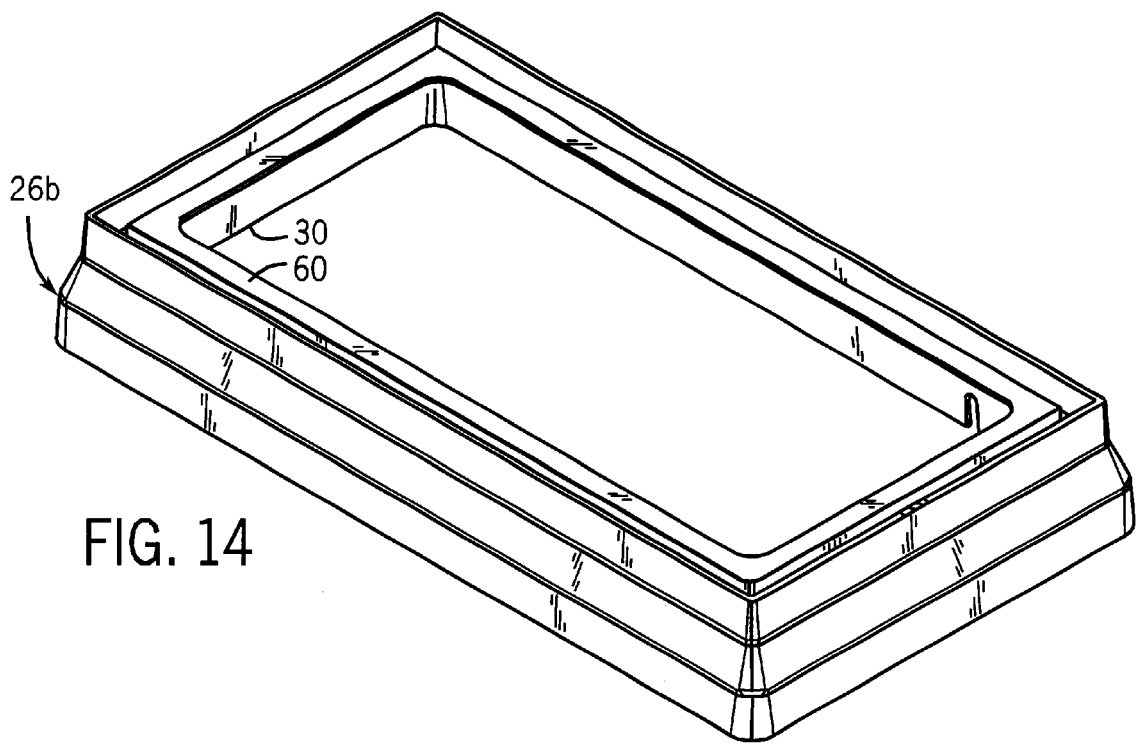
FIG. 14 is like FIG. 13 and shows another embodiment.

If the rectangular tank of FIG. 1 is glass, then the base of FIG. 13 is used, and the mounting support details are as shown in FIGS. 5 and 6, as above described. If the rectangular tank of FIG. 1 is plastic, then the base 26b of FIG. 14 is used, and the mounting support details are as illustrated in FIGS. 9 and 10. The bowed tank of FIG. 2 may be plastic or glass. If the bowed tank of FIG. 2 is plastic, then the base 26a of FIG. 12 is used, and the mounting support details are as illustrated in FIGS. 9 and 10. If the bowed tank of FIG. 2 is glass, then the base 26c of FIG. 11 is used, as also illustrated in FIG. 7 as an alternate embodiment, including tank 22b, and the mounting support details are as illustrated in FIGS. 5–7. Bases 26, 26a, 26b, 26c are preferably plastic.

Peripheral skirt 34, FIG. 6, has a lower extension 62 extending downwardly from upper extension 36. Upper and lower extensions 36 and 62 merge along a concave outer profile 64 having a radius of curvature eliminating a step transition at the junction of upper and lower extensions 36 and 62 along such outer profile. This radius provides a cover-up for any molding sinks or other undesirable or aesthetically unpleasing lines.

Peripheral skirt 34, FIG. 6, has a first segment 66 extending upwardly from lower surface 30 at a first angle relative to vertical, and a second segment 68 extending upwardly from first segment 66 at a second angle relative to vertical. The noted second angle is greater than the noted first angle. Peripheral skirt 34 has a third segment 70 providing the noted upper extension 36 extending upwardly from upper surface 32 and second segment 68 vertically along and adjacent and outward of the aquarium tank and at a third angle relative to vertical. The noted third angle is less than the noted second angle and less than the noted first angle.

In FIG. 6, upper surface 32 extends horizontally inwardly from the junction 64 of the noted second and third segments 68 and 70. In FIG. 10, upper surface 32a has the noted first portion 56 extending horizontally inwardly from the junction 64a of second and third segments 68a and 70a of skirt 34a, and has the noted second portion 58 extending upwardly from first portion 56, and has the noted third portion 60 extending horizontally inwardly from second portion 58.

Peripheral skirt 34 has a first periphery 72, FIG. 6, at lower surface 30, and a second periphery 74 at upper surface 32. First periphery 72 is greater than second periphery 74. Peripheral skirt 34 extends upwardly and diagonally inwardly from first periphery 72 at lower surface 30 to second periphery 74 at upper surface 32. Peripheral skirt 34 has an outer profile having a first peripheral footprint at periphery 72 at lower surface 30, and a second peripheral footprint at periphery 74 at upper surface 32. Second peripheral footprint 74 is substantially coextensive with the periphery of the aquarium tank. First peripheral footprint 72 is larger than second peripheral footprint 74 and the periphery of the aquarium tank, for enhanced stability. Plastic tank versions and bowed versions likewise have a peripheral skirt 34a, FIG. 10, having a first periphery 72a at lower surface 30a, and a second periphery 74a at upper surface 32a, wherein first periphery 72a is greater than second periphery 74a, wherein peripheral skirt 34a extends upwardly and diagonally inwardly from first periphery 72a at lower surface 30a to second periphery 74a at upper surface 32a, wherein peripheral skirt 34a has an outer profile having a first peripheral footprint at periphery 72a at lower surface 30a and a second peripheral footprint at periphery 74a at upper surface 32a, the second peripheral footprint at 74a being substantially coextensive with the periphery of the aquarium tank, the first peripheral footprint 72a being larger than the second peripheral footprint 74a and the periphery of the aquarium tank, for enhanced stability.

Figure 4:
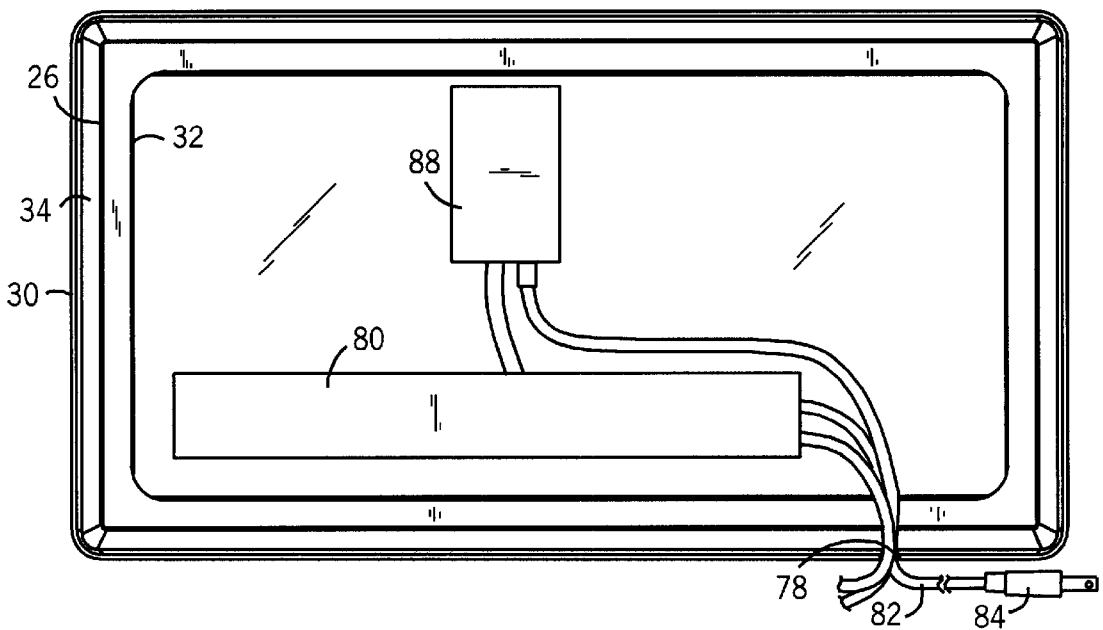
FIG. 4 is a bottom elevation view of the aquarium assembly of FIG. 1 taken along line 4—4 of FIG. 3.

Peripheral skirt 34 encloses the space 76, FIG. 5, between horizontal support surface 30 and the bottom 39 of the tank. Skirt 34 has a slot 78 therethrough, FIGS. 4, 5, 13. Aquarium accessory components are in enclosed space 76 and are connected to conduits extending through slot 78. An electrical receptacle power strip 80, FIGS. 4, 5, in space 76 has an electrical conductor 82 supplying electrical power thereto from electrical plug 84, FIG. 3, plugged into external wall socket 86. Air pump 88, FIG. 5, has a power cord 90 having a plug 92 plugged into power strip 80, and has an output conduit air line 94 carrying pumped air and supplying same into tank 22. Air line 94 extends through slot 78 then around the back of the tank and then around the top of the tank and then downwardly into the tank and has a lower terminating end at 96 in the gravel or sand 98 in the bottom of the tank. Tank cover 24 has a light 100, as known in the prior art. Electrical power to the light is supplied by electrical conductor 102 extending along the back of the tank and then through slot 78 and plugged into power strip 80 in space 76. Three conduits, namely electrical conductors 82 and 102 and air line 94, extend through slot 78. Space 76a, FIG. 9, in bowed skirt version 34a having described herein and are not part of the present invention.

It is recognized that various equivalents, alternatives and modifications are possible within the scope of the appended claims.

What is claimed is:

1. An aquarium base for supporting an aquarium tank above a horizontal support surface, comprising a base member extending horizontally around a periphery generally coextensive with the periphery of said tank, said base member having a lower surface resting on said horizontal support surface, said base member having an upper surface upon which said aquarium tank rests, said base member having a peripheral skirt extending generally vertically between said upper and lower surfaces, and extending around said periphery, wherein said peripheral skirt has an upper extension extending upwardly from said upper surface vertically along and adjacent and outward of said aquarium tank, said upper extension terminates at an upper reach above the bottom of said aquarium tank, said peripheral skirt has a lower extension extending downwardly from said upper extension, and wherein said upper and lower extensions merge along a concave outer profile having a radius of curvature eliminating a step transition at the junction of said upper and lower extensions along said outer profile.

2. An aquarium base for supporting an aquarium tank above a horizontal support surface, comprising a base member extending horizontally around a periphery generally coextensive with the periphery of said tank, said base member having a lower surface resting on said horizontal support surface, said base member having an upper surface upon which said aquarium tank rests, said base member having a peripheral skirt extending generally vertically between said upper and lower surfaces, and extending around said periphery, wherein said peripheral skirt has a first segment extending upwardly from said lower surface at a first angle relative to vertical, and a second segment extending upwardly from said first segment to said upper surface at a second angle relative to vertical, said second angle being greater than said first angle, said peripheral skirt has a third segment providing an upper extension extending upwardly from said upper surface and said second segment vertically along and adjacent and outward of said aquarium tank and at a third angle relative to vertical, said third angle being less than said second angle.

3. The invention according to claim 2 wherein said third angle is less than said first angle.

4. The invention according to claim 2 wherein said upper surface extends horizontally from the junction of said second and third segments.

5. The invention according to claim 4 wherein said upper surface has a first portion extending horizontally inwardly from the junction of said second and third segments, a second portion extending upwardly from said first portion, and a third portion extending horizontally inwardly from said second portion.

6. The invention according to claim 5 wherein said third portion supports said aquarium tank.

7. The invention according to claim 5 wherein said third segment has an upper reach above said upper surface.

8. An aquarium base for supporting an aquarium tank above a horizontal support surface, comprising a base member extending horizontally around a periphery generally coextensive with the periphery of said tank, said base member having a lower surface resting on said horizontal support surface, said base member having an upper surface upon which said aquarium tank rests, said base member having a peripheral skirt enclosing the space between said horizontal support surface and the bottom of said aquarium tank, said skirt having a slot therethrough, at least one aquarium accessory component in said enclosed space, and at least one conduit connected to said component and extending through said slot, and comprising an air pump in said enclosed space, and comprising two said conduits extending through said slot, namely an electrical conductor for supplying electrical power to said air pump, and an air line carrying pumped air from said air pump through said slot and into said aquarium tank.

9. The invention according to claim 8 comprising a light for illuminating said tank, and comprising two said components in said enclosed space, namely said air pump and an electrical receptacle strip, and three said conduits extending through said slot, namely first and second electrical conductors and said air line, said first electrical conductor supplying electrical power to said electrical receptacle strip, said air pump being plugged into said electrical receptacle strip, said air line supplying pumped air from said air pump to said tank, said second electrical conductor supplying electrical power from said electrical receptacle strip to said light.

* * * * *